US012768689B2

(12) United States Patent
Schulte et al.

(10) Patent No.: US 12,768,689 B2
(45) Date of Patent: Oct. 20, 2026

(54) NON-VERTICAL WITH SPACER PLATE

(71) Applicant: M&S Flowmatics, Inc., Amarillo, TX (US)

(72) Inventors: Royce Wayne Schulte, Amarillo, TX (US); Shad Wyatt McDaniel, Dalhart, TX (US)

(73) Assignee: M&S Flowmatics, Inc., Amarillo, TX (US)

( * ) Notice: Subject to any disclaimer, the term of this patent is extended or adjusted under 35 U.S.C. 154(b) by 256 days.

(21) Appl. No.: 18/813,447

(22) Filed: Aug. 23, 2024

(65) Prior Publication Data

US 2025/0067582 A1 Feb. 27, 2025

Related U.S. Application Data

(60) Provisional application No. 63/578,861, filed on Aug. 25, 2023.

(51) Int. Cl.

*G01F 1/07* (2006.01)
*G01F 1/20* (2006.01)
*G01F 1/30* (2006.01)

(52) U.S. Cl.

CPC ...................................... *G01F 1/07* (2013.01)

(58) Field of Classification Search

CPC .......... G01F 1/662; G01F 25/10; G01F 1/667; G01F 15/14; G01F 1/8436; G01F 1/8477; G01F 1/58; G01F 15/00; G01F 1/8413; G01F 1/66; G01F 1/74; G01F 1/60; G01F 5/00; G01F 15/18; G01F 15/024; G01F 15/185; G01F 1/6842; G01F 1/588; G01F 1/684; G01F 1/84; G01F 1/8409; G01F 1/584; G01F 1/586; G01F 15/02;

(Continued)

(56) References Cited

U.S. PATENT DOCUMENTS 1,883,017 A 10/1932 Sholtz
2,652,141 A 9/1953 Gilmore (Continued)

FOREIGN PATENT DOCUMENTS

GB 2019914 A 11/1979
WO 2010025526 A1 3/2010

OTHER PUBLICATIONS

Notice of Allowance dated Aug. 12, 2025; U.S. Appl. No. 18/424,148, filed Jan. 26, 2024; 5 pages.

(Continued)

*Primary Examiner* — Andre J Allen

(74) *Attorney, Agent, or Firm* — Conley Rose, P.C.; J. Robert Brown, Jr.

(57) ABSTRACT

A non-vertical flow meter is provided. The non-vertical flow meter includes a chamber, sensing box, load cell, guide, and a spacer plate. The chamber disposed at a non-vertical angle and comprising an inlet and an outlet, wherein the inlet and the outlet are disposed at the non-vertical angle. The sensing box disposed within the chamber, wherein the sensing box has a pivoting sensing surface, the pivoting sensing surface disposed on an interior surface within the non-vertically disposed chamber. The load cell in operational communication with the pivoting sensing surface, and the guide disposed within the chamber. The spacer plate coupled between the sensing box and the load cell.

20 Claims, 10 Drawing Sheets

(58) Field of Classification Search

CPC .......... G01F 1/8431; G01F 1/44; G01F 1/696; G01F 1/849; G01F 25/00; G01F 15/005; G01F 1/668; G01F 1/8472; G01F 1/28; G01F 1/6845; G01F 15/006; G01F 1/00; G01F 1/698; G01F 1/8422; G01F 1/34; G01F 1/6965; G01F 1/6847; G01F 1/8418; G01F 1/42; G01F 1/36; G01F 1/115; G01F 1/8427; G01F 1/40; G01F 1/86; G01F 1/69; G01F 3/10; G01F 1/692; G01F 1/68; G01F 1/10; G01F 15/022; G01F 7/00; G01F 15/12; G01F 1/22; G01F 1/3209; G01F 1/075; G01F 15/06; G01F 15/063; G01F 1/72; G01F 1/06; G01F 1/32; G01F 1/8495; G01F 1/663; G01F 1/24; G01F 25/15; G01F 1/363; G01F 25/13; G01F 1/88; G01F 1/3218; G01F 1/699; G01F 1/56; G01F 1/3227; G01F 1/50; G01F 15/08; G01F 1/002; G01F 15/125; G01F 15/04; G01F 1/08; G01F 1/3266; G01F 15/068; G01F 1/12; G01F 1/7082; G01F 15/10; G01F 1/76; G01F 1/52; G01F 1/26; G01F 1/712; G01F 1/46; G01F 1/8486; G01F 1/666; G01F 1/8468; G01F 15/0755; G01F 1/80; G01F 1/716; G01F 1/05; G01F 1/8404; G01F 3/08; G01F 25/17; G01F 15/007; G01F 15/07; G01F 1/688; G01F 15/075; G01F 1/661; G01F 1/325; G01F 15/066; G01F 1/3259; G01F 1/845; G01F 1/125; G01F 3/16; G01F 1/78; G01F 15/043; G01F 1/38; G01F 1/6888; G01F 15/061; G01F 1/20; G01F 1/383; G01F 5/005; G01F 1/206; G01F 1/3287; G01F 15/003; G01F 25/11; G01F 1/6986; G01F 1/704; G01F 3/20; G01F 1/007; G01F 1/30; G01F 1/065; G01F 1/582; G01F 1/103; G01F 1/64; G01F 25/14; G01F 15/001; G01F 1/7084; G01F 1/7086; G01F 15/002; G01F 7/005; G01F 1/372; G01F 22/00; G01F 1/07; G01F 3/18; G01F 15/046; G01F 1/3273; G01F 1/708; G01F 15/065; G01F 1/056; G01F 1/0755; G01F 11/28; G01F 1/8481; G01F 1/82; G01F 1/375; G01F 1/37; G01F 15/028; G01F 13/00; G01F 15/105; G01F 1/11; G01F 1/3282; G01F 1/90; G01F 1/665; G01F 1/7044; G01F 3/00; G01F 3/38; G01F 9/00; G01F 22/02; G01F 3/065; G01F 1/8454; G01F 23/296; G01F 1/1155; G01F 1/8463; G01F 1/8459; G01F 1/386; G01F 15/16; G01F 25/0092; G01F 3/12; G01F 23/00; G01F 1/053; G01F 1/3236; G01F 1/54; G01F 1/6983; G01F 3/06; G01F 3/24; G01F 9/001; G01F 1/6882; G01F 11/006; G01F 23/2962; G01F 3/227; G01F 1/48; G01F 23/14; G01F 15/008; G01F 23/603; G01F 1/6884; G01F 11/04; G01F 13/006; G01F 23/263; G01F 23/284; G01F 15/026; G01F 23/72; G01F 25/12; G01F 1/7046; G01F 23/24; G01F 23/0007; G01F 3/22; G01F 1/005; G01F 23/242; G01F 3/14; G01F 1/844; G01F 11/00; G01F 11/30; G01F 3/226; G01F 23/26; G01F 3/02; G01F 3/28; G01F 9/006; G01F 3/225; G01F 23/18; G01F 23/22; G01F 23/2968; G01F 25/0084; G01F 3/223; G01F 23/292; G01F 3/224; G01F 9/023; G01F 1/7042; G01F 17/00; G01F 23/2928; G01F 25/20; G01F 3/221; G01F 3/228; G01F 3/30; G01F 3/36; G01F 1/8445; G01F 11/284; G01F 23/80; G01F 23/02; G01F 1/366; G01F 11/20; G01F 13/008; G01F 23/28; G01F 23/30; G01F 9/003; G01F 11/262; G01F 1/7048; G01F 9/026; G01F 1/106; G01F 1/377; G01F 1/7088; G01F 11/08; G01F 11/22; G01F 23/20; G01F 3/04; G01F 11/02; G01F 11/021; G01F 11/42; G01F 13/001; G01F 1/785; G01F 11/024; G01F 11/32; G01F 23/246; G01F 23/38; G01F 23/64; G01F 9/008; G01F 11/029; G01F 11/10; G01F 11/267; G01F 23/165; G01F 23/2961; G01F 23/58; G01F 23/62; G01F 23/66; G01F 23/76; G01F 3/222; G01F 11/023; G01F 11/06; G01F 11/44; G01F 13/005; G01F 19/00; G01F 23/04; G01F 23/241; G01F 23/2965; G01F 23/46; G01F 23/56; G01F 23/585; G01F 23/606; G01F 23/74; G01F 23/804; G01F 3/26; G01F 3/32

See application file for complete search history.

(56) References Cited

U.S. PATENT DOCUMENTS

| | | | | |
|---|---|---|---|---|
| 2,941,401 | A | | 6/1960 | Streeter |
| 3,056,293 | A | | 10/1962 | Ofner |
| 3,167,953 | A | | 2/1965 | Dillon |
| 3,212,330 | A | | 10/1965 | De Pollier |
| 3,232,486 | A | | 2/1966 | Ofner |
| 3,269,181 | A | | 8/1966 | Seay |
| 3,351,236 | A | | 11/1967 | Sorenson et al. |
| 3,523,451 | A | | 8/1970 | Kohn |
| 3,611,803 | A | | 10/1971 | Kajiura |
| 3,640,136 | A | | 2/1972 | Nolte |
| 3,724,720 | A | | 4/1973 | Bullivant |
| 3,774,446 | A | | 11/1973 | Diehl |
| 3,878,103 | A | | 4/1975 | Miller |
| 3,939,709 | A | | 2/1976 | Echtler |
| 3,945,532 | A | | 3/1976 | Marks |
| 4,067,238 | A | | 1/1978 | Oetiker |
| 4,157,661 | A | | 6/1979 | Schindel |
| 4,254,664 | A | | 3/1981 | Graham |
| 4,397,423 | A | | 8/1983 | Beaver |
| 4,440,029 | A | | 4/1984 | Tomiyasu |
| 4,554,687 | A | | 11/1985 | Carter et al. |
| 4,637,262 | A | | 1/1987 | Vesa |
| 4,765,190 | A | | 8/1988 | Strubbe |
| 4,768,387 | A | | 9/1988 | Kemp |
| 4,788,930 | A | | 12/1988 | Matteau |
| 5,065,632 | A | | 11/1991 | Reuter |
| 5,078,012 | A | | 1/1992 | Ding et al. |
| 5,118,410 | A | | 6/1992 | Rumberger |
| 5,335,554 | A | | 8/1994 | Kempf |
| 5,343,761 | A | | 9/1994 | Myers |
| 5,423,456 | A | | 6/1995 | Arendonk |
| 5,561,250 | A | | 10/1996 | Myers |
| 5,752,545 | A | | 5/1998 | Vienneau |
| 5,798,466 | A | * | 8/1998 | Satake .................... G01F 25/10 73/861.73 |
| 5,837,906 | A | | 11/1998 | Palmer |
| 5,895,865 | A | | 4/1999 | Ozawa |
| 6,073,667 | A | | 6/2000 | Graffin |
| 6,094,994 | A | | 8/2000 | Satake |
| 6,327,916 | B1 | | 12/2001 | Kallioinen et al. |
| 6,339,901 | B1 | | 1/2002 | Weder |

(56) References Cited

U.S. PATENT DOCUMENTS

| | | | | |
|---|---|---|---|---|
| 6,367,336 | B1 | 4/2002 | Martina | |
| 6,471,032 | B2 | 10/2002 | Buscchaert et al. | |
| 6,504,114 | B1 | 1/2003 | Lockery et al. | |
| 6,805,014 | B1 | 10/2004 | Shyy | |
| 6,814,108 | B1 | 11/2004 | Brandt, Jr. | |
| 6,973,843 | B2 | 12/2005 | Shyy | |
| 7,323,644 | B2 | 1/2008 | Hanaoka et al. | |
| 7,509,880 | B2 * | 3/2009 | Kurz | A01K 67/0276 73/861.85 |
| 8,015,884 | B1 | 9/2011 | Carr et al. | |
| 8,347,709 | B2 | 1/2013 | Kormann | |
| 9,068,867 | B2 * | 6/2015 | Ayers | G01F 1/46 |
| 9,354,092 | B2 | 5/2016 | Shyy | |
| 10,473,496 | B2 | 11/2019 | Misra et al. | |
| 11,892,332 | B2 | 2/2024 | Misra et al. | |
| 12,492,924 | B2 * | 12/2025 | Misra | G01F 1/30 |
| 2007/0163362 | A1 | 7/2007 | Wehrs et al. | |
| 2013/0118242 | A1 | 5/2013 | Sudou | |
| 2015/0205304 | A1 | 7/2015 | Shyy et al. | |
| 2016/0153819 | A1 | 6/2016 | Unger et al. | |
| 2024/0167858 | A1 | 5/2024 | Misra et al. | |

OTHER PUBLICATIONS

Office Action dated May 2, 2025; U.S. Appl. No. 18/424,148, filed Jan. 26, 2024; 11 pages.

FeedPro; "FeedPro: A Step Up to Better Pork Production Through Improved Feed Blending", Agtronix; Pella Electronics Co. Inc., Pella, IA; 5 pages.

Office Action dated Jan. 6, 2021; U.S. Appl. No. 16/679,989, filed Nov. 11, 2019; 20 pages.

Final Office Action dated Oct. 15, 2021; U.S. Appl. No. 16/679,989, filed Nov. 11, 2019; 18 pages.

Office Action dated Apr. 1, 2022; U.S. Appl. No. 16/679,989, filed Nov. 11, 2019; 14 pages.

Final Office Action dated Dec. 6, 2022; U.S. Appl. No. 16/679,989, filed Nov. 11, 2019; 14 pages.

Office Action dated Jun. 23, 2023; U.S. Appl. No. 16/679,989, filed Nov. 11, 2019; 11 pages.

Notice of Allowance dated Oct. 12, 2023; U.S. Appl. No. 16/679,989, filed Nov. 11, 2019; 10 pages.

Office Action dated Sep. 5, 2018; U.S. Appl. No. 15/700,967, filed Sep. 11, 2017; 8 pages.

Office Action dated Mar. 4, 2019; U.S. Appl. No. 15/700,967, filed Sep. 11, 2017; 10 pages.

Notice of Allowance dated Jul. 8, 2019; U.S. Appl. No. 15/700,967, filed Sep. 11, 2017; 10 pages.

Office Action dated Oct. 27, 2016; U.S. Appl. No. 14/577,224, filed Dec. 19, 2014; 14 pages.

Final Office Action dated Apr. 13, 2017; U.S. Appl. No. 14/577,224, filed Dec. 19, 2014; 6 pages.

Office Action dated Nov. 8, 2017; U.S. Appl. No. 14/577,224, filed Dec. 19, 2014; 9 pages.

Office Action dated Mar. 11, 2015; U.S. Appl. No. 13/829,022, filed Mar. 14, 2013; 14 pages.

Final Office Action dated Jun. 25, 2015; U.S. Appl. No. 13/829,022, filed Mar. 14, 2013; 10 pages.

Notice of Allowance dated Sep. 10, 2015; U.S. Appl. No. 13/829,022, filed Mar. 14, 2013; 5 pages.

Notice of Allowance dated Mar. 11, 2016; U.S. Appl. No. 13/829,022, filed Mar. 14, 2013; 10 pages.

Office Action dated Sep. 23, 2024; U.S. Appl. No. 18/424,148, filed Jan. 26, 2024; 23 pages.

* cited by examiner

NON-VERTICAL WITH SPACER PLATE

CROSS-REFERENCE TO RELATED APPLICATIONS

This application claims priority to U.S. Provisional Patent Application No. 63/578,861 filed Aug. 25, 2023 by Royce W. Schulte, et al. entitled, "Flow Meter with Spacer Plate", which is incorporated by reference herein as if reproduced in its entirety.

TECHNICAL FIELD

The disclosed technology relates generally to devices, systems and methods for monitoring the flow of particulate matter, and in particular, to a flow meter with a spacer plate.

BACKGROUND

The disclosure relates to apparatus, systems, and methods for the measurement of particulate matter flow, particularly in non-vertical settings, including horizontal settings. Various applications also work in traditional vertical settings.

Bulk materials are often moved by gravity through inclined spouts. Real time, in-line and accurate flow measurement without interrupting flow in these inclined spouts present a tremendous technical challenge. Monitoring and managing material flow in real time for conditioning of grains or seeds, for example, can increase operating efficiency and can improve profitability.

Accurate flow measurement can result in improved process management and significant cost saving for companies handling high value products such as seeds and food grade materials, including powders, grain and feed handling, corn and soybean processing, popcorn, dry food ingredients, plastic pellets, and pharmaceuticals. Continuous monitoring of flow rates can also provide useful information for equipment adjustment or integrating with a process such as adding a chemical in seed treating or ingredients during food processing.

Vertical flow meters that provide real-time data often require the vertical "falling" of the material, due to the gravity requirements. Considerable head space and remodeling of existing piping are needed to make the flow vertical which is expensive.

Non-vertical flow meters, such as described in U.S. patent application Ser. No. 18/424,148 entitled "Devices, Systems, and Methods for Measuring Flow" filed Jan. 26, 2024, to Misra et al., which is incorporated herein by reference for all purposes, may have certain advantages.

BRIEF SUMMARY

A non-vertical flow meter is provided. The non-vertical flow meter includes a chamber, sensing box, load cell, guide, and a spacer plate. The chamber disposed at a non-vertical angle and comprising an inlet and an outlet, wherein the inlet and the outlet are disposed at the non-vertical angle. The sensing box disposed within the chamber, wherein the sensing box has a pivoting sensing surface, the pivoting sensing surface disposed on an interior surface within the non-vertically disposed chamber. The load cell in operational communication with the pivoting sensing surface, and the guide disposed within the chamber. The spacer plate coupled between the sensing box and the load cell.

A method is provided that includes providing a non-vertical flow meter. The non-vertical flow meter including a chamber, a sensing box and a load cell. The chamber disposed at a non-vertical angle and comprising an inlet and outlet, wherein the inlet and the outlet are positioned at the non-vertical angle, a sensing box disposed within the chamber, wherein the sensing box has a sensing surface, the sensing surface disposed on an interior surface within the non-vertically disposed chamber and shaped to facilitate flow of a material, a load cell in operational communication with the one sensing surface. The non-vertical flow meter also has a guide disposed upstream of the sensing surface, and a spacer plate coupled to the load cell and the sensing box.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various embodiments disclosed or contemplated herein relate to flow meters and particularly to a flow meter with a spacer plate. Namely a flow meter that is configured to function in a variety of non-vertical orientations as well as traditional vertical implementations.

Figure 1:
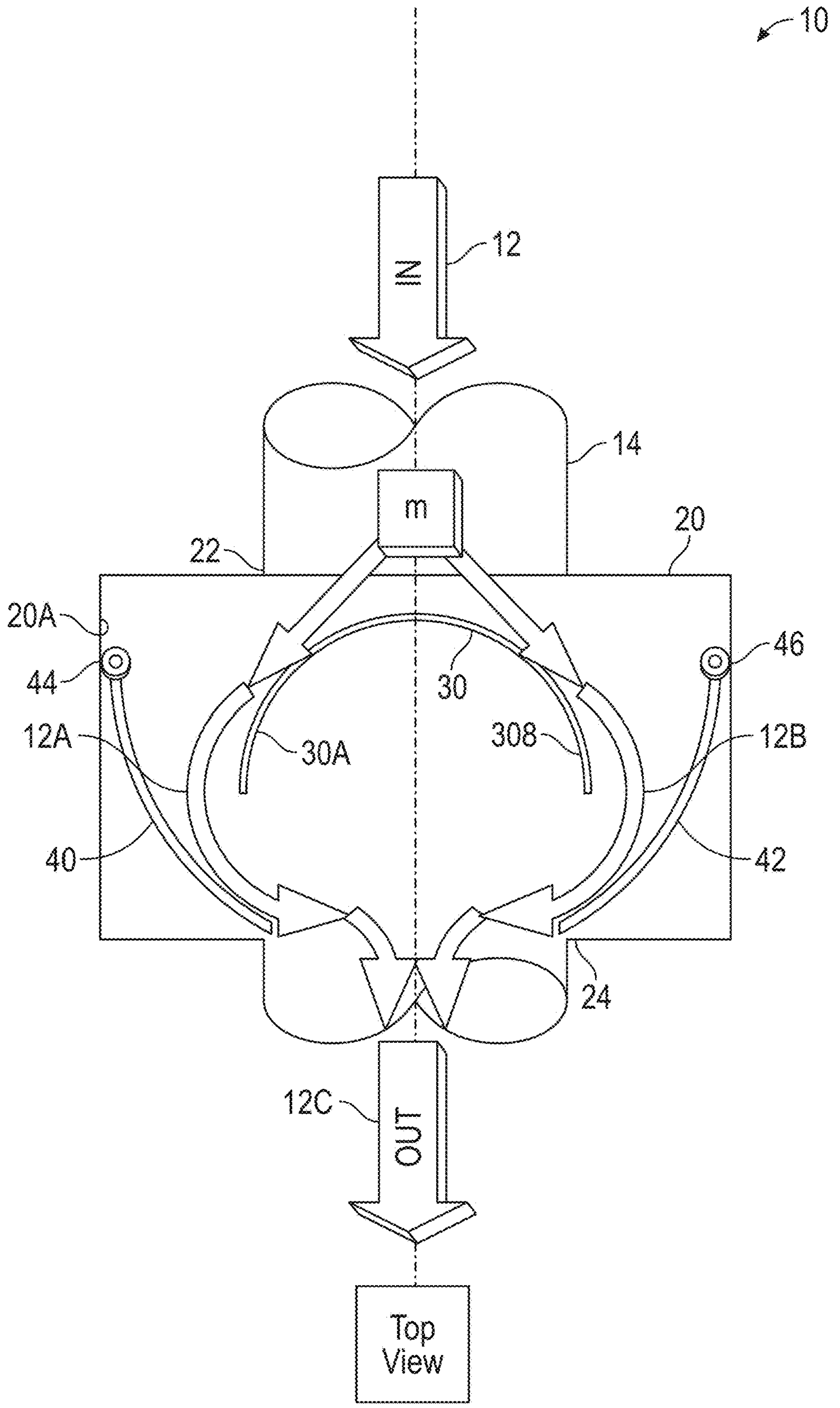
FIG. 1 is a cross-sectional front view of one implementation of the flow meter.

As shown in FIG. 1, the various implementations of the flow meter 10 determine the real-time flowrate of a stream 12 of particulate materials moving in an pipe 14, such as a pipe 14 on an incline or other conduit without interrupting the flow or changing the existing configuration. These implementations can be used in vertical, non-vertical or horizontal applications. In various implementations, such as horizontal or inclined implementations, a combination of gravity and/or other motive forces, such as pneumatic forces, the application of vacuums, or conveyor belts can be used to move particulate matter through the flow meter 10, as would be appreciated by one of skill in the art. It will be appreciated that in certain implementations, the material may also be flowing in a direction opposite of the force of gravity, so as to flow upwards.

In these implementations, the flow meter 10 comprises a flow measurement chamber 20 having inlet 22 and outlet 24 ends configured or otherwise constructed and arranged to allow a material stream 12 to pass through the flow measurement chamber 20. In various implementations, the material stream is particulate, such as a crop, seed or powders such as pharmaceuticals, as would be understood.

In the implementation of FIG. 1, the flow measurement chamber 20 is generally rectangularly cylindrical with a lumen 20A within, but in alternate embodiments can be otherwise shaped, with the inlet 22 configured to couple to an existing pipe to bring the stream 12 to the flow measurement chamber 20 and an outlet 24 matching to the existing exit configuration for the materials to flow out of the flow measurement chamber 20.

As shown in FIGS. 1-4, in the lumen 20A, according to these implementations, a guide 30 is disposed upstream within the lumen 20A and configured to divide and move the material stream 12 around the sides 30A, 308 of the guide 30. In certain implementations, and as shown in FIG. 1, the guide 30 is shaped like a half-cylinder, but alternate shapes such as a wedge or other known configuration can also be used.

In use, the material 12A, 12B flows into at least one downstream sensing surface 40, 42 which is attached to the flow measurement chamber 20 via at least one pivot 44, 46. In various implementations, the one or more downstream sensing surfaces 40, 42 can be curved, hemispheric, substantially planar (e.g., as shown in FIG. 5B) or any of many other forms capable of being urged downstream in response to the pressure applied by the flowing material 12A, 12B. In various implementations, the pivot or pivots 44, 46 can be operationally integrated with springs (not shown) or other devices configured to urge the sensing surfaces 40, 42 into a defined position in the absence of any flowable material 12A, 12B.

As described herein, the measurement of the various streams of material 12A, 12B pressure flowing over the guide 30 is made via the mounted downstream sensing surfaces 40, 42 via the pressure applied to those downstream sensing surfaces 40, 42. In these implementations, the materials 12A, 12B flowing over the downstream sensing surfaces 40, 42 are subsequently combined as shown in output 12C to exit the flow measurement chamber 20 through the outlet 24 without interrupting the flow of the material 12A,

12B. It is understood that in certain implementations, the shape—such as curvature—of the sensing surfaces can facilitate the movement of the material 12A, 12B in the direction of the outlet 24. It is understood that in various implementations, the flow of material 12A, 12B through the flow measurement chamber 20 in these implementations, the downstream sensing surface or surfaces 40, 42 are urged downstream in response to the pressure applied by the material 12A, 12B of flowable stream 12.

Figure 2:
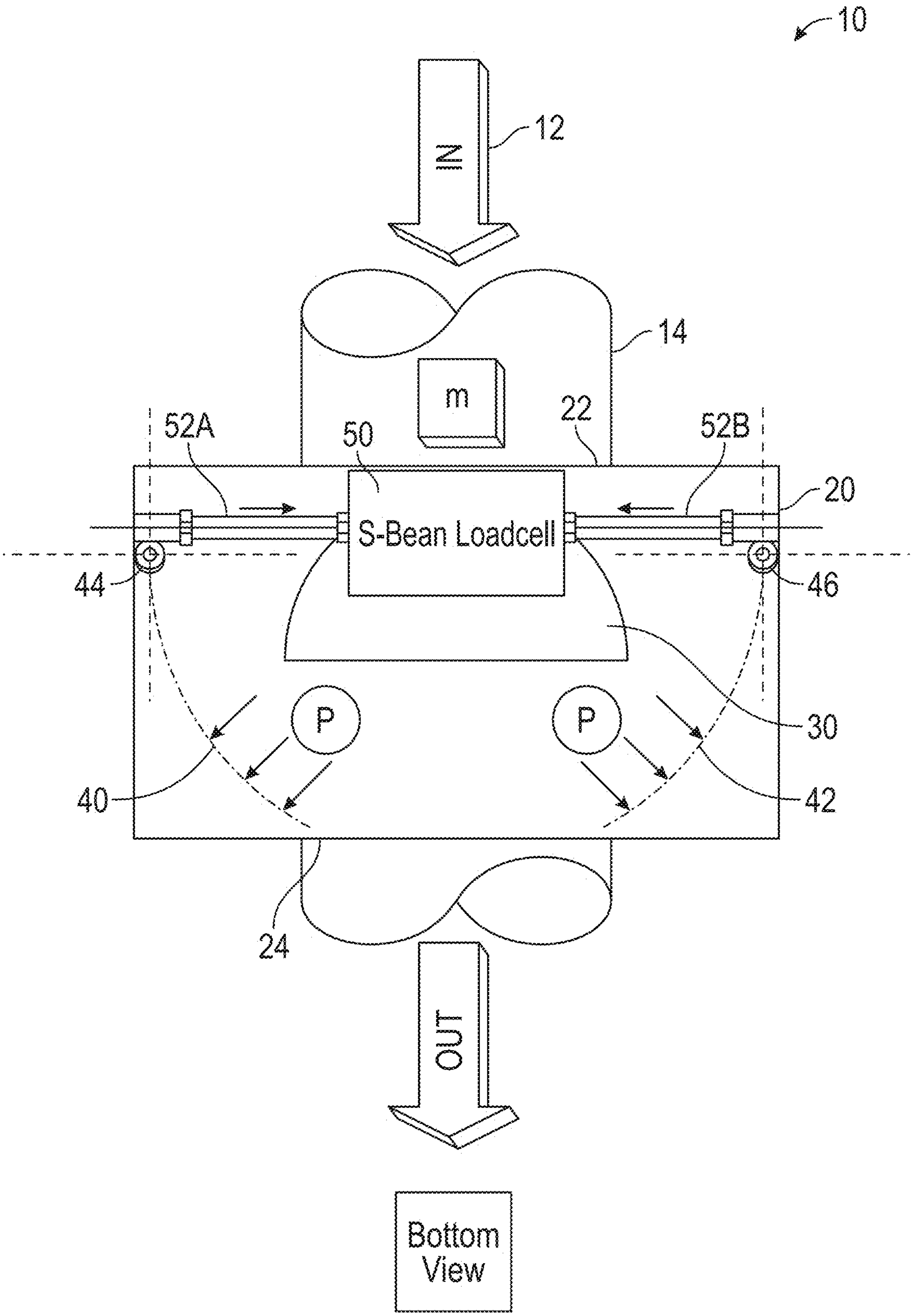
FIG. 2 is a cross-sectional front view of another implementation of the flow meter.

As shown in FIG. 2, in these implementations, the pivots 44, 46 are operationally connected to a load cell 50—such as an S-Bean load cell 50—via a linkage assembly 52A, 52B with a damper to reduce any vibrations and/or shocks. In these implementations, the load cell 50 is therefore mechanically coupled with the pivoting downstream sensing surfaces 40, 42 so as to be able to measure movement of the downstream sensing surfaces 40, 42 and generate an electrical output signal proportional to the force and/or pressure applied (designated by reference arrows P) to the downstream sensing surfaces 40, 42 by the flowing material 12A, 12B.

Figure 3:
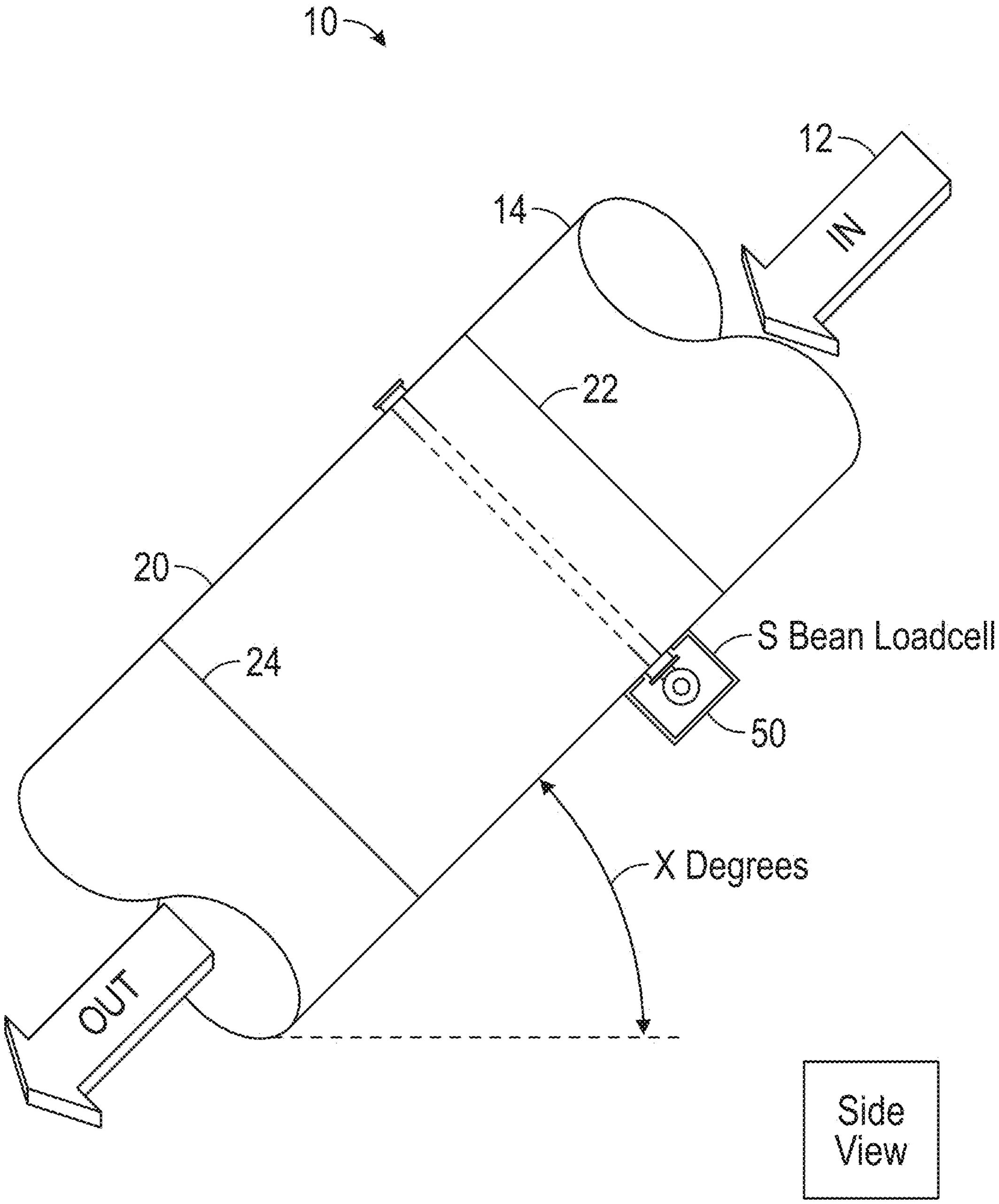
FIG. 3 is a side view of another implementation of the flow meter at a non-vertical angle.
Figure 4:
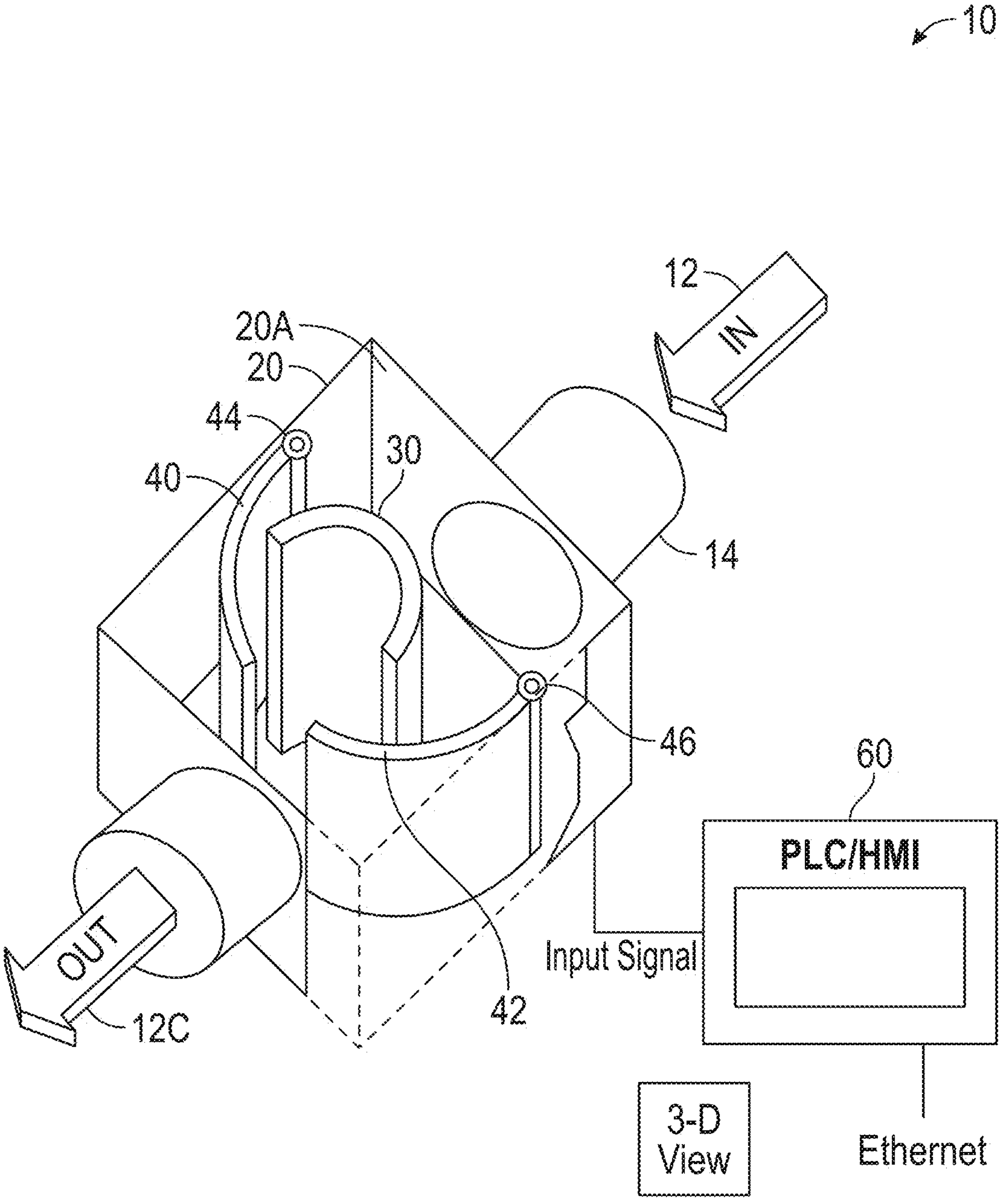
FIG. 4 is a cross-sectional perspective view of another implementation of the flow meter at a non-vertical angle.

It is therefore understood that this output signal is proportional to the mass flow rate of the materials 12A, 12B, regardless of the orientation of the flow measurement chamber 20, as is shown in FIG. 3. In various implementations the force and/or pressure applied by the flowing materials 12A, 12B on curved downstream sensing surfaces 40, 42 can be amplified by controlling the cantilever leveraging action of the curved downstream sensing surfaces 40, 42, as would be understood by one of skill in the art. Because there are a plurality of sensing surfaces, and the flow rate is determined by the aggregate force on the plurality of downstream sensing surfaces 40, 42, the portion of material 12A, 12B encountering each individual downstream sensing surface 40, 42 is generally irrelevant.

In various implementations, a measurement device 60 is also provided, such as a computer having an operations system, processor and memory or a programmable logic controller/human machine interface (PLC/HMI) or other similar device known in the art and capable of processing and analyzing data. In various implementations, software can be provided and used on the measurement device to process and convert the signals from each of the downstream sensing surfaces 40, 42 to weigh measurements, which can be combined to give a total flow rate. In certain implementations, the measurement device can be connected to the internet, such as via an ethernet connection, and can also be in electronic communication with any number of known components, such as a display, a database, controls and the like.

It is understood that the combination of these measurements therefore allows the flow meter 10 to operate at various non-vertical angles, as the rate of flow over each of the downstream sensing surfaces 40, 42 need not be equal to calculate an accurate, real-time flow rate. The total weight of materials for any given period can be calculated by summing the pressure applied to the downstream sensing surfaces 40, 42 in the real time. It is understood that various corrections or other calculations can be used to establish the correlation between the pressure applied to each of the downstream sensing surfaces 40, 42 and the actual flow rate of the material.

Figure 5A:
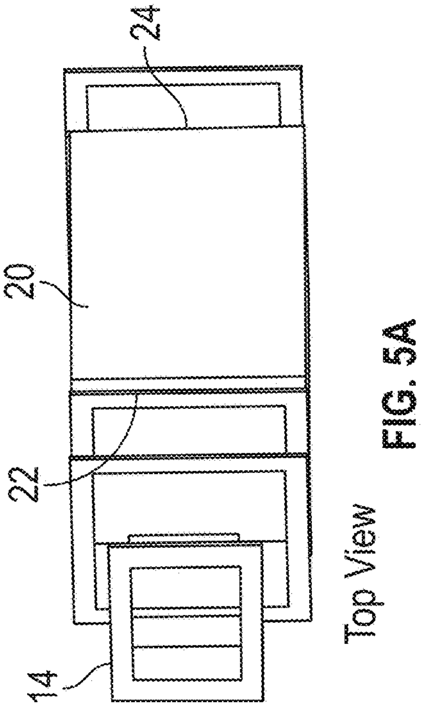
FIG. 5A is a top view of another implementation of the flow meter at a non-vertical angle.
Figure 5B:
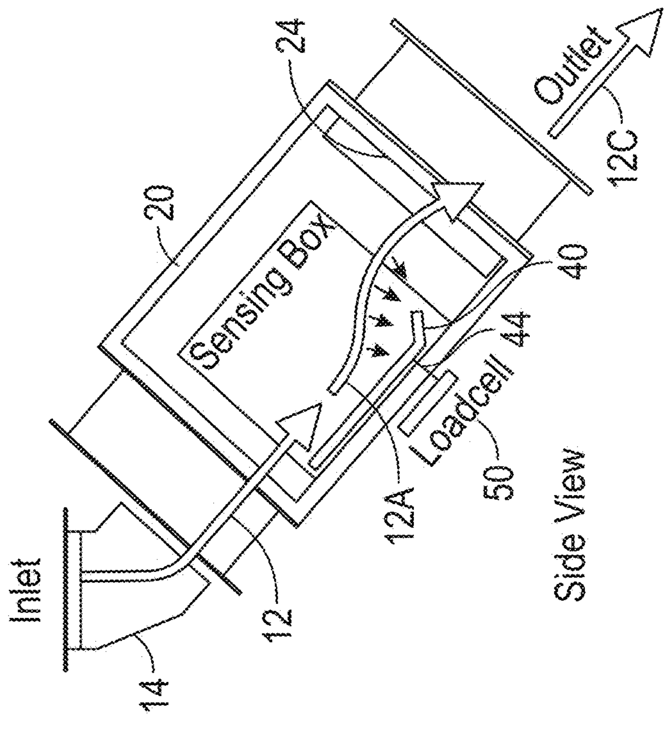
FIG. 5B is a cross-sectional side view of another implementation of the flow meter at a non-vertical angle.
Figure 5C:
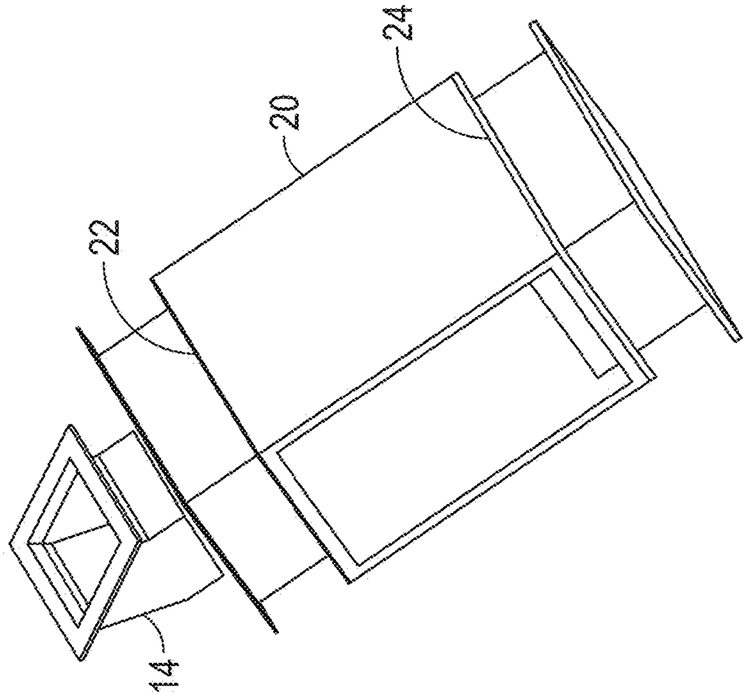
FIG. 5C is a perspective view of another implementation of the flow meter at a non-vertical angle.

As shown in FIGS. 5A-5C, like FIGS. 1-4, in use, the material 12A, 12B flows into at least one downstream sensing surface 40 which is attached to the non-vertical flow measurement chamber 20 via at least one pivot 44. In various implementations, the one or more sensing surfaces 40, 42 can be curved, hemispheric, substantially planar or any of many other forms capable of being urged downstream in response to the pressure applied by the flowing material 12A, 12B. Thus, at least one pivoting sensing surface 40, 42 is shaped to facilitate the movement of the material 12A, 12B in the direction of the outlet 24. In various implementations, the pivot or pivots 44, 46 can be operationally integrated with springs (not shown) or other devices configured to urge the downstream sensing surfaces 40, 42 into a defined position in the absence of any flowable material 12A, 12B.

Figure 6:
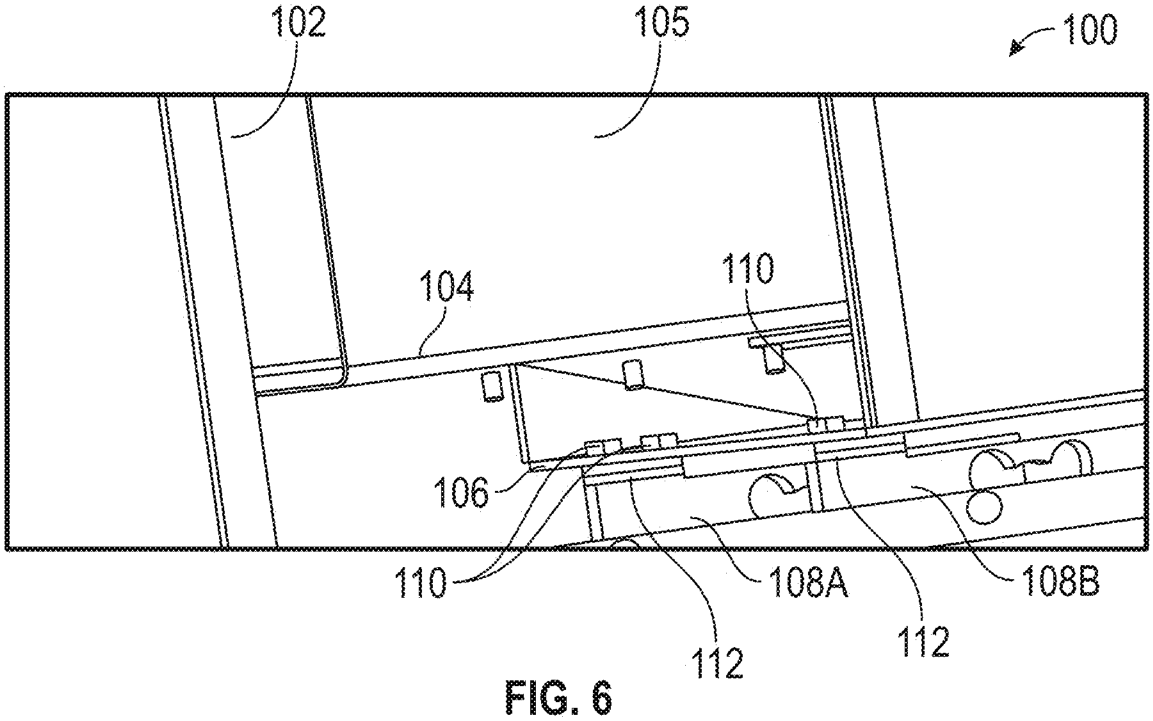
FIG. 6 is a side perspective view of an interior portion of a flow meter according to one embodiment of the present disclosure.
Figure 7:
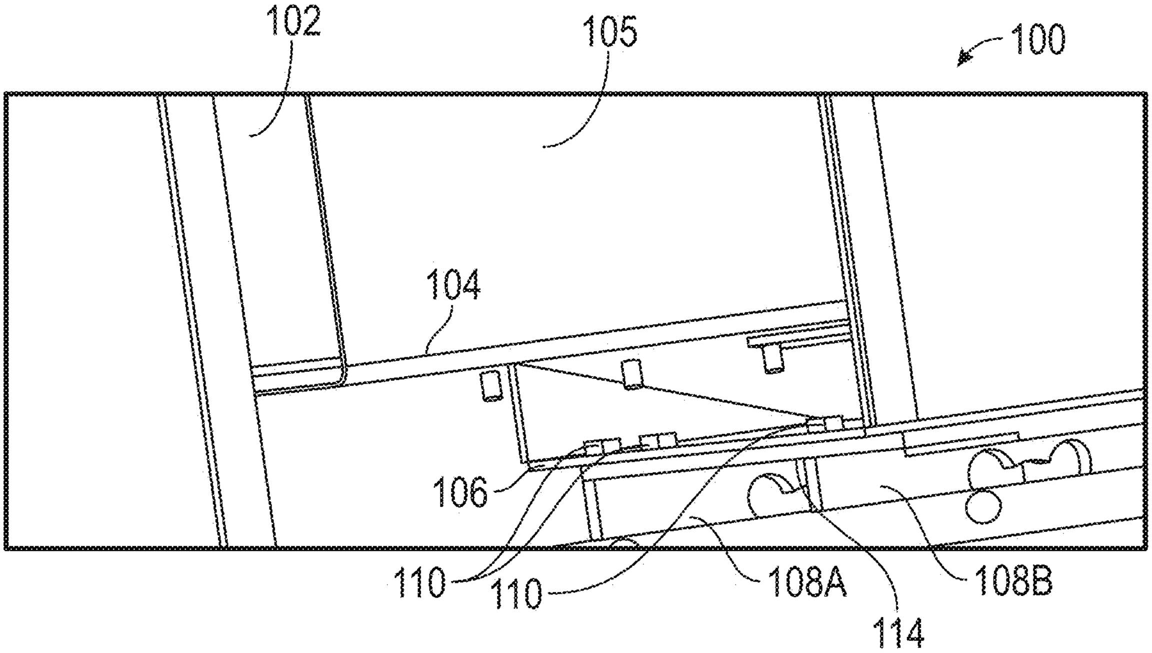
FIG. 7 is another side perspective view of an interior portion of a flow meter according to one embodiment of the present disclosure.

FIGS. 6 and 7 illustrate a partial side view of a flow meter 100 with a side panel removed exposing interior components. The flow meter 100 may be any device or system used to measure the flow of particulate matter. The flow meter 100, for example, may be similar in some respects to the flow meter described above including those illustrated in FIGS. 5A-5C.

As shown in FIGS. 6 and 7, the flow meter 100 includes an inner chamber 102 through which particulate matter to be measured may flow. A pivoting sensing plate 104 and sensing box 105 are located in the inner chamber 102 and pivot in response to the flow of particulate matter flowing through the sensing box 105. A lower side 106 of the sensing box 105 is positioned below and coupled to the sensing plate 104. The sensing box 105 is further coupled to load cells 108A and 108B adjacent the lower side 106. The sensing box 105 may be connected or attached to the load cells 108A and 108B via bolts 110 or other coupling. As shown in FIG. 6, shims 112 may be positioned between the interface of the sensing box 105 and the load cells 108A and 108B. Thus, as particulate matter engages the sensing plate 104, the force is transferred to the load cells 108A and 108B via the sensing box 105.

For various reasons, such as case of construction, maintenance and repair, replacement of internal components, and so on, the load cells 108A and 108B and accompanying assemblies may need to be accessed, removed, or disconnected from the flow meter 100, and more specifically, the sensing box 105. Due to space constraints and other considerations, it may be difficult for repair personnel to readily access the bolts 110 and further to properly align the bolts 110 and shims 112 when re-attaching the sensing box 105 to the load cells 108A and 108B.

As shown in FIG. 7, instead of employing shims 112, the present disclosure provides one or more spacer plates 114 or brackets employed at the interface of the sensing box 105 and the load cells 108A and 108B. The spacer plate(s) 114 are located below the lower side 106 of the sensing box 105 and extend from load cell 108A to load cell 108B.

Figure 8:
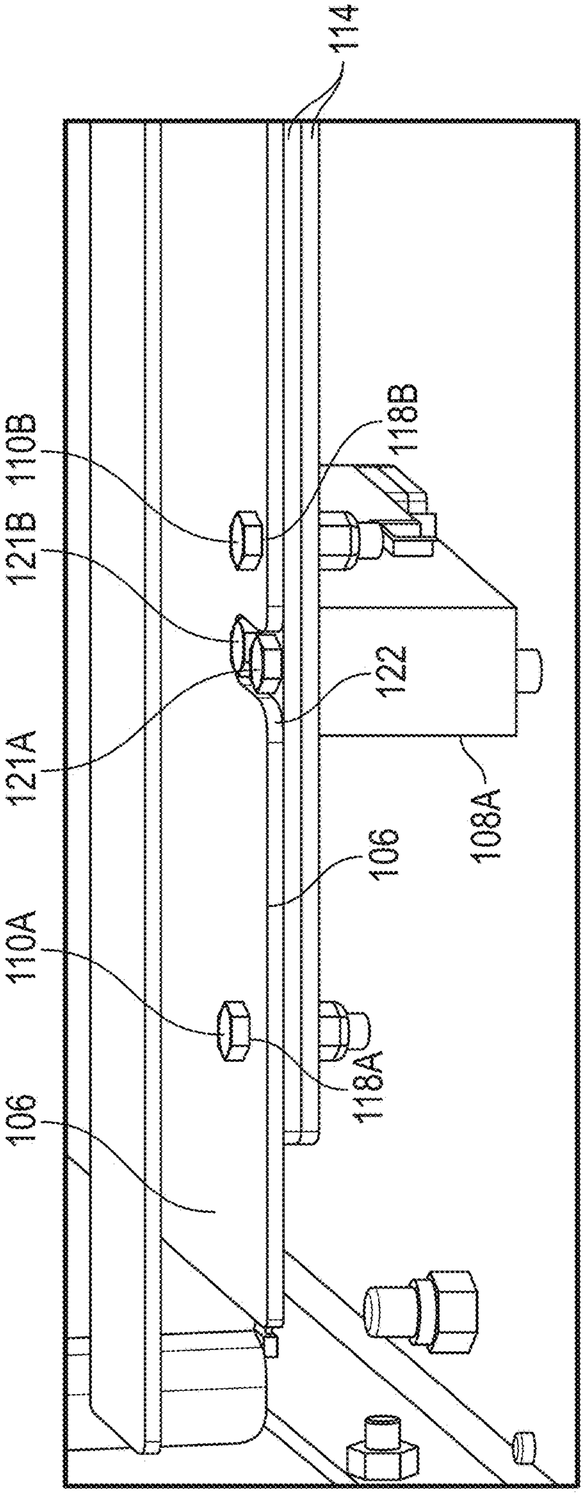
FIG. 8 is a perspective view of two spacer plates attached to a lower side of a sensing box in a flow meter according to one embodiment of the present disclosure.

FIG. 8 illustrates a partial cut-away of a portion of the sensing box 105 and load cell 108A. In this embodiment, two spacer plates 114 are illustrated attached to a lower side 106 of the sensing box 105. The two spacer plates 114 are attached to the lower side 106 of the sensing box 105 via bolts 110A-B through the interior holes or openings 118A-B.

The spacer plates 114 are coupled to the load cells 108A by load cell bolts 121A and 121B. As can be seen in this illustration, the lower side 106 of the sensing box 105 has grooves 122 or notches located adjacent the interface of the spacer plates 114 and the load cell 108A. A similar groove 122 is provided adjacent the interface of the spacer plate 114 and the load cell 108B. The groove 122 in the lower side 106 of the sensing box 105 allows the load cell bolts 121A and 121B to engage the spacer plates 114 and the load cells 108A and 108B but not engage the sensing box 105. The groove, or notch, 122 allows the spacer plate 114 to be flush to the lower side 106 of the sensing box 105, without engaging the sensing box 105. When the bolts 110A-B through interior holes 118A-B that couple the spacer plate 114 to the lower side 106 of the sensing box 105 are removed, the load cell bolts 121A and 121B remain attached to the load cell 108A, and the spacer plate 114 is separated from the lower side 106 of the sensing box 105. In this manner, the sensing box 105 may be removed to access the load cells 108A and 108B. It will be appreciated that, in some embodiments, other bolts, connections, or attachments of the sensing box 105 to the inner chamber 102 of the flow meter 100 may need to be disconnected in order to remove the sensing box 105 from the inner chamber 102, depending on the configuration and design of the particular flow meter 100.

The spacer plate 114 provides a way to access the load cells 108A and 108B by removing the sensing box 105. Instead of coupling the load cells 108A and 108B directly to the lower side 106 of the sensing box 105, the spacer plate 114 sits in between the components and separately attaches to both the load cells 108A and 108B and the sensing box 105. In other words, the load cells 108A and 108B are not directly connected to the sensing box 105, but rather the load cells 108A and 108B are connected to the spacer plate 114, which is connected to the sensing box 105. Thus, rather than attempting to remove the load cells 108A or 108B in the tight space under the sensing box 105, the sensing box 105 may be readily removed, leaving the spacer plate 114 and load cells 108A and 108B in place. This provides a way to perform maintenance, repair, replacement, among other tasks, on the load cells 108A and 108B without the hindrance and added challenge of completing those tasks under sever spacing constraints.

Figure 9:
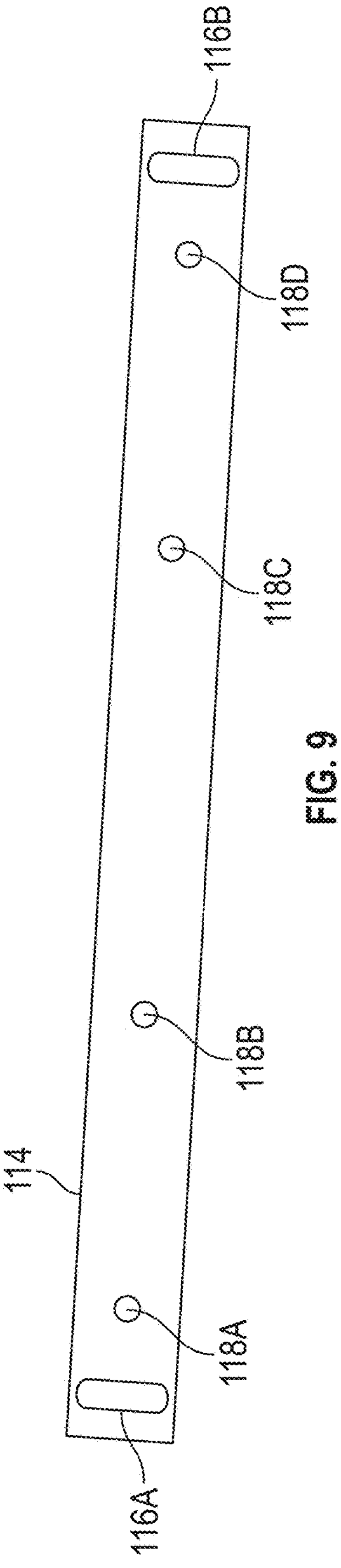
FIG. 9 is a top view of a spacer plate according to one embodiment of the present disclosure.
Figure 10:
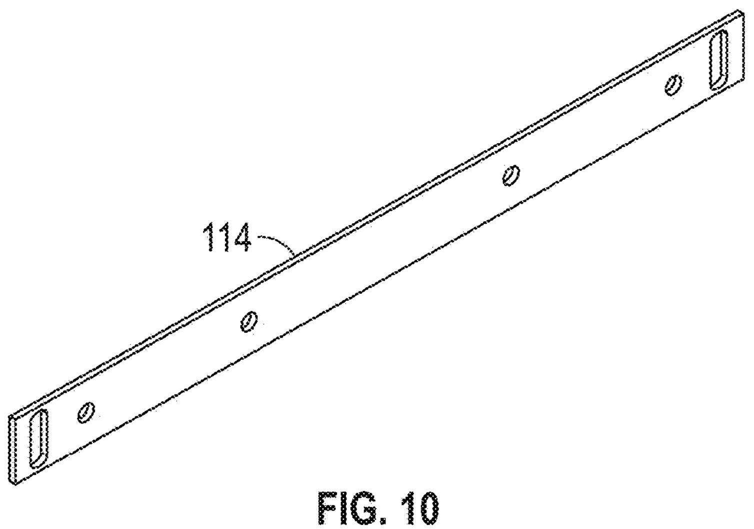
FIG. 10 is a perspective view of a spacer plate according to one embodiment of the present disclosure.

FIGS. 9 and 10 illustrate an embodiment of the spacer plate 114. The spacer plate 114 is a generally rigid rectangular member and may be constructed of various materials such as metal. In this embodiment, the spacer plate includes two (2) load cell holes or openings 116A-B and four (4) interior holes or openings 118A-D, although more or fewer holes provided at varying locations may be used in other embodiments.

Figure 11:
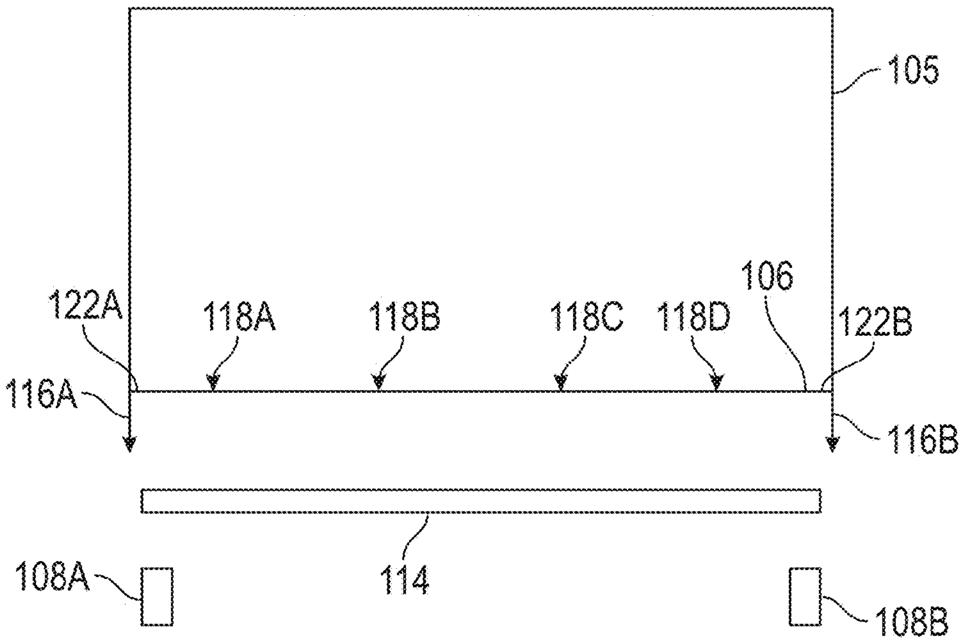
FIG. 11 is an illustration of an assembly of components of the flow meter according to one embodiment of the present disclosure.

Referring also to FIG. 11, the lower side 106 of the sensing box 105 may include holes or openings that extend through a lower side 106 of the sensing box 105 that correspond to that of the interior holes 118A-D of the spacer plate 114. The spacer plate 114 may be attached at interior holes 118A-D, via bolts 110 or otherwise, to the lower side 106 of the sensing box 105. The sensing box 105 includes grooves 122A and 122B adjacent the load cells 108A and 108B and load cell holes 116A-B in the spacer plate 114. In this manner, the spacer plate 114 connects, via fasteners through the load cell holes 116A-B of the spacer plate 114, and to load cells 108A-B.

Figure 12:
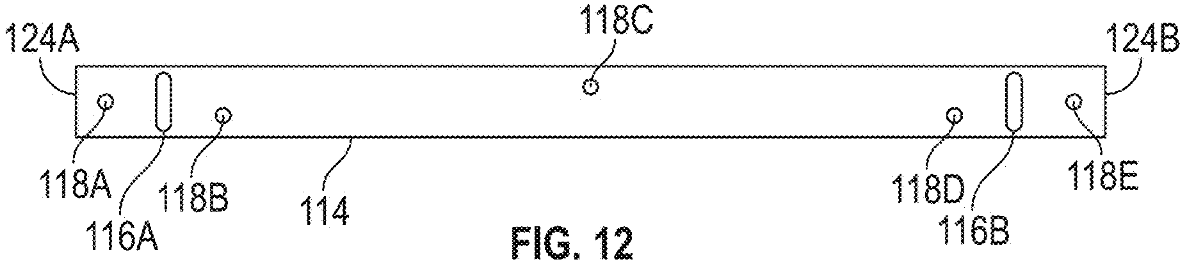
FIG. 12 is a top view of another embodiment of the spacer plate according to one embodiment of the present disclosure.

FIG. 12 illustrates another embodiment of the spacer plate 114. In contrast to the embodiment shown in FIGS. 9-10, in this embodiment, the load cell holes 116A-B that receive the bolts for attachment to the load cells 108A and 108B are not positioned on the extreme edges 124A-B. Further, instead of four (4) interior holes 118A-D, this embodiment provides five (5) interior holes 118A-E for connection to the lower side 106 of the sensing box 105. It will be appreciated that any the number and location of the load cell holes 116A-B and interior holes 118A-E may be used.

Figure 13:
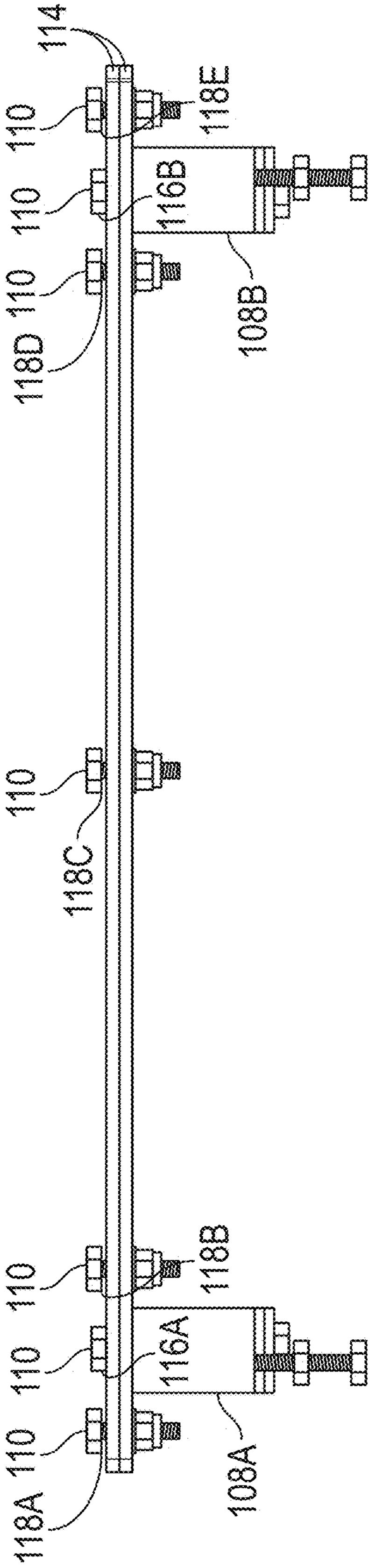
FIG. 13 is a front view illustrating two spacer plates attached to the load cells according to one embodiment of the present disclosure.
Figure 14:
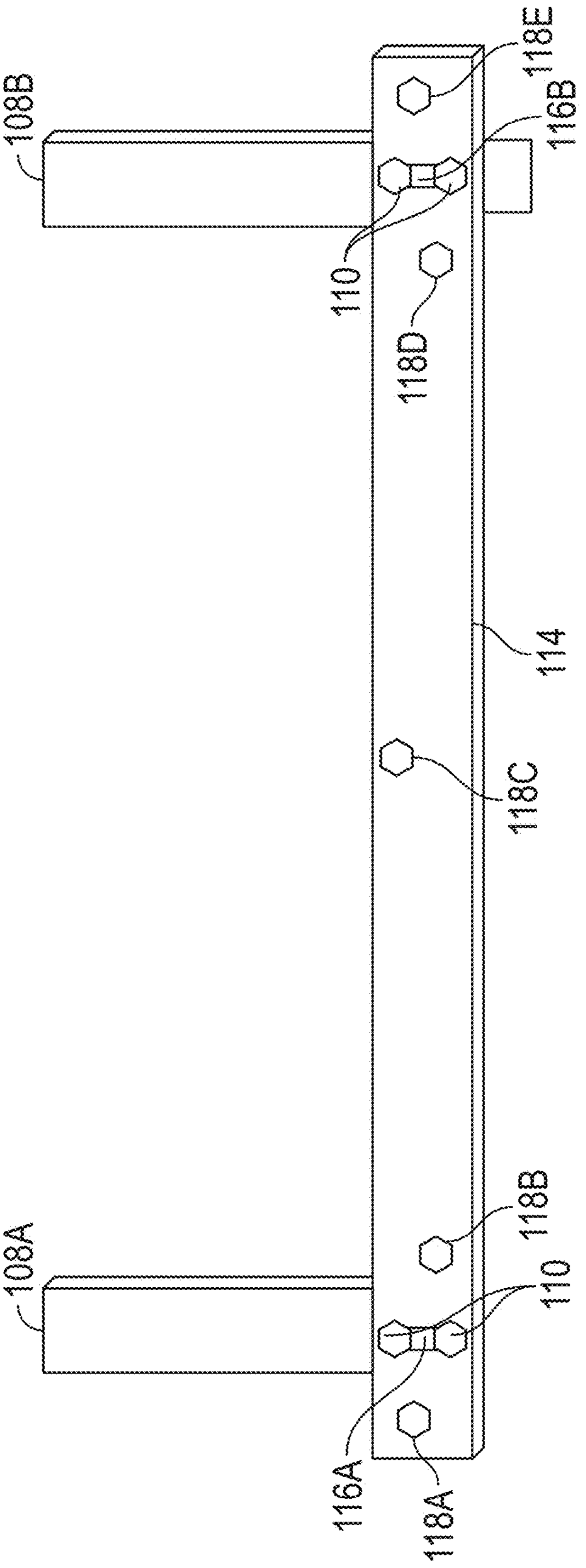
FIG. 14 is a top view of the spacer plates attached to the load cells according to one embodiment of the present disclosure.

FIGS. 13 and 14 illustrate front and top views, respectively, of an embodiment of the spacer plate(s) 114 shown coupled to the load cells 108A and 108B. Notably the sensing box 105 has been removed from these views. FIGS. 13 and 14 illustrate two of the spacer plates 114 shown in FIG. 12. In this embodiment, the spacer plates 114 are coupled to load cell 108A through load cell hole 116A and to load cell 108B through load cell hole 116B by bolts 110. Bolts 110 extend through the interior holes or openings 118A-E of the spacer plate 114 and corresponding openings in the lower side 106 of the sensing box 105 to attach the spacer plates 114 to the lower side 106 of the sensing box 105.

The spacer plate 114 replaces multiple components, for example, the shims 112, and may simplify maintenance and replacement when required. Further, the spacer plate 114 allows for such maintenance and replacement of various internal components without completely removing or uninstalling the entire flow sensor which may reduce downtime.

Figure 15:
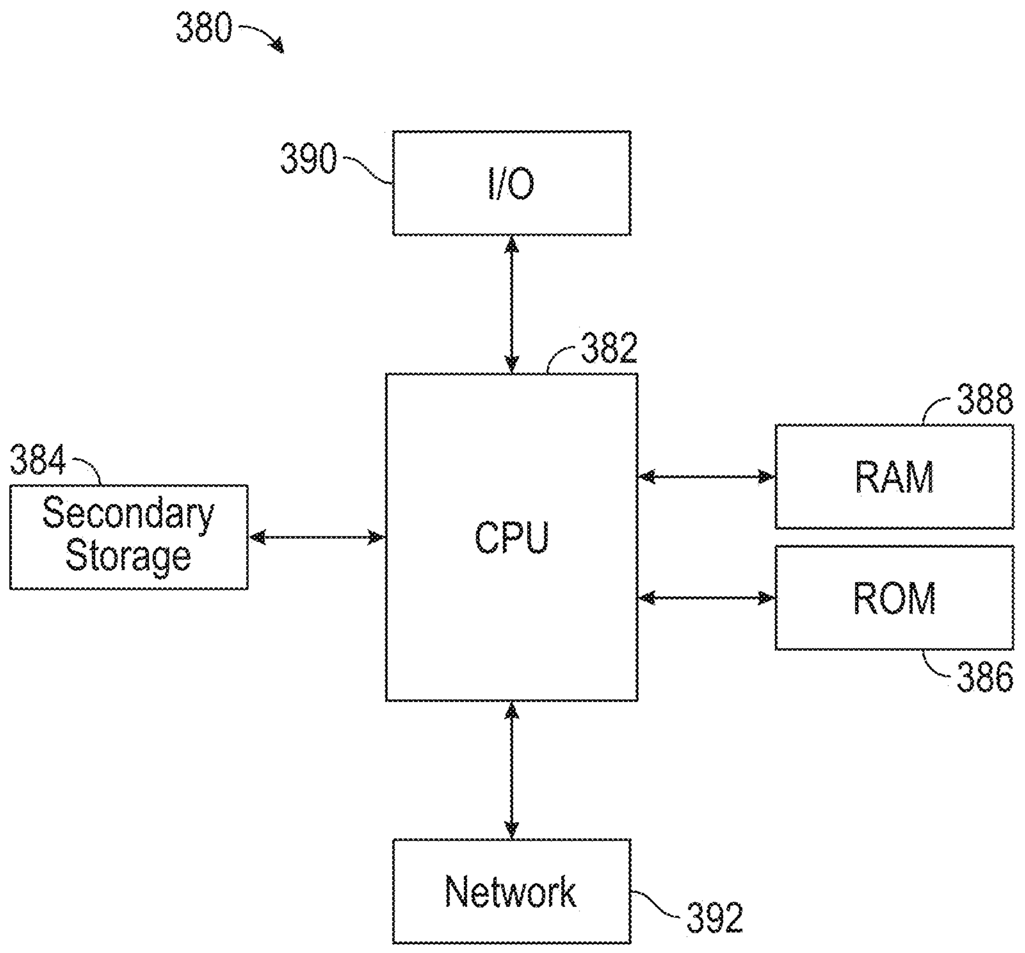
FIG. 15 is a diagram of one embodiment of a computer system capable of implementing the systems and methods described herein.

As discussed above, the flow meter 100 may include various components including load cells 108A and 108B. Such flow meter 100 components may be in communication with various computer and/or control systems to monitor and measure various sensors and systems of the flow meter 100. These computer and/or control systems may be implemented as a computer program or tool on a computer system or accessible by computer system via a web interface and implemented as computer software applications or instructions executing on a computer system. FIG. 15 illustrates such a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips. The computer system 380 may also include programmable logic controllers (PLCs) and human machine interfaces (HMIs).

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID), and/or the like. The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Although the disclosure has been described with reference to preferred embodiments, persons skilled in the art will recognize that changes may be made in form and detail without departing from the spirit and scope of the disclosed apparatus, systems and methods.

What is claimed is:

1. A non-vertical flow meter comprising:

a chamber disposed at a non-vertical angle and comprising an inlet and an outlet, wherein the inlet and the outlet are disposed at the non-vertical angle;

a sensing box disposed within the chamber, wherein the sensing box has a pivoting sensing surface, the pivoting sensing surface disposed on an interior surface within the non-vertically disposed chamber;

a load cell in operational communication with the pivoting sensing surface;

a guide disposed within the chamber; and a spacer plate coupled between the sensing box and the load cell.

2. The non-vertical flow meter of claim 1, wherein the spacer plate is coupled to a surface of a lower portion of the sensing box.

3. The non-vertical flow meter of claim 2, wherein the lower portion of the surface of the sensing box further comprises a plurality of U-shaped grooves.

4. The non-vertical flow meter of claim 1, wherein the spacer plate has a first plurality of openings through which mechanical fasteners are positioned to couple the spacer plate to a lower portion of the sensing box.

5. The non-vertical flow meter of claim 4, wherein the spacer plate has a second plurality of openings through which mechanical fasteners are positioned to couple the spacer plate to a plurality of connection points of the load cell.

6. The non-vertical flow meter of claim 1, wherein a lower portion of the surface of the sensing box further comprises a plurality of U-shaped grooves, wherein the spacer plate has a plurality of elongated openings, and wherein respective elongated openings are adjacent respective U-shaped grooves when the spacer plate is attached to the sensing box and the load cell.

7. The non-vertical flow meter of claim 1, wherein the spacer plate has a first plurality of openings through which mechanical fasteners are inserted and only couple the spacer plate to a lower portion of the sensing box, wherein the spacer plate has a second plurality of openings through which mechanical fasteners are inserted and couple only the spacer plate to a plurality of connection points of the load cell, wherein the lower portion of the surface of the sensing box further comprises a plurality of U-shaped grooves, and wherein respective the second plurality of openings are adjacent respective U-shaped grooves when the spacer plate is attached to the sensing box and the plurality of connection points of the load cell.

8. The non-vertical flow meter of claim 1, further comprising a plurality of spacer plates, and wherein the spacer plates are made of a rigid material.

9. The non-vertical flow meter of claim 1, wherein the load cell has a first load cell connection point adjacent a lower side of the sensing box and adjacent a first opening in the spacer plate, wherein the load cell has a second load cell connection point adjacent the lower side of the sensing box and adjacent a second opening in the spacer plate, wherein first and second fasteners fasten the spacer plate only to the load cell via the first and second load cell connection points, and not the lower side of the sensing box, via the first and second opening in the spacer plate.

10. The non-vertical flow meter of claim 9, further comprising at least one opening in the lower side of the sensing box, and wherein the spacer plate has at least one third opening between the first and second openings in the spacer plate, and wherein at least one third fastener fastens the spacer plate only to the sensing box, and not the load cell, via the at least third opening in the spacer plate.

11. A method, comprising:

providing a non-vertical flow meter having:

a chamber disposed at a non-vertical angle and comprising an inlet and outlet, wherein the inlet and the outlet are positioned at the non-vertical angle, a sensing box disposed within the chamber, wherein the sensing box has a sensing surface, the sensing surface disposed on an interior surface within the non-vertically disposed chamber and shaped to facilitate flow of a material, a load cell in operational communication with the one sensing surface, a guide disposed upstream of the sensing surface, and a spacer plate coupled to the load cell and the sensing box.

12. The method of claim 11, further comprising:

coupling the spacer plate only to the load cell via first and second fasteners through first and second openings in the spacer plate; and coupling the spacer plate only to a lower portion of the sensing box using third and fourth fasteners through third and fourth openings in the spacer plate.

13. The method of claim 12, further comprising:

removing the third and fourth fasteners; and removing the sensing box from the chamber of the non-vertical flow meter without removing the first and second fasteners.

14. The method of claim 13, further comprising one or more of accessing, repairing, or replacing the load cell while the sensing box is removed from the non-vertical flow meter.

15. The method of claim 11, wherein the spacer plate has a first plurality of openings through which mechanical fasteners are inserted to couple the spacer plate to a lower portion of the sensing box.

16. The method of claim 15, wherein the spacer plate has a second plurality of openings through which mechanical fasteners are inserted to couple the spacer plate to a plurality of connection points of the load cell.

17. The method of claim 11, wherein a lower portion of the surface of the sensing box further comprises a plurality of U-shaped grooves, wherein the spacer plate has a plurality of elongated openings, and wherein the respective elongated openings are adjacent respective U-shaped grooves when the spacer plate is attached to the sensing box and the load cell.

18. The method of claim 11, wherein the spacer plate has a first plurality of openings through which mechanical fasteners are inserted and only couple the spacer plate to a lower portion of the sensing box, wherein the spacer plate has a second plurality of openings through which mechanical fasteners are inserted and only couple the spacer plate to the load cell, wherein the lower portion of the surface of the sensing box further comprises a plurality of U-shaped grooves, and wherein respective second plurality of openings are adjacent respective U-Shaped grooves when the spacer plate is attached to the sensing box and the load cell.

19. The method of claim 11, wherein the load cell has a first load cell connection point adjacent a lower side of the sensing box and adjacent a first opening in the spacer plate, wherein the load cell has a second load cell connection point adjacent the lower side of the sensing box and adjacent a second opening in the spacer plate, wherein a first and second fasteners fasten the spacer plate only to the load cell, and not the lower side of the sensing box, via the first and second opening in the spacer plate.

20. The method of claim 19, further comprising at least one opening in the lower side of sensing box, and wherein the spacer plate has at least one third opening between the first and second openings in the spacer plate, and wherein at least one third fastener fastens the spacer plate only to the sensing box, and not the load cell, via the at least third opening in the spacer plate.

* * * * *